(12) United States Patent
Mednikov

(10) Patent No.: US 6,246,230 B1
(45) Date of Patent: Jun. 12, 2001

(54) NON-CONTACT POSITION SENSOR

(75) Inventor: Felix Mednikov, Samara (RU)

(73) Assignee: Micro-Epsilon Messtechnik GmbH & Co. KG, Ortenburg (DE)

(*) Notice: Subject to any disclaimer, the term of this patent is extended or adjusted under 35 U.S.C. 154(b) by 0 days.

(21) Appl. No.: 09/230,698

(22) PCT Filed: Jul. 30, 1997

(86) PCT No.: PCT/DE97/01611

§ 371 Date: Apr. 19, 1999

§ 102(e) Date: Apr. 19, 1999

(87) PCT Pub. No.: WO98/04886

PCT Pub. Date: Feb. 5, 1998

(30) Foreign Application Priority Data

Jul. 30, 1996 (DE) .............................. 196 30 657

(51) Int. Cl.[7] .................. G01B 7/14; G01D 5/20
(52) U.S. Cl. ................... 324/207.16; 324/207.12; 324/207.24
(58) Field of Search ........... 324/207.12, 207.15–207.19, 324/207.22, 207.24, 225; 340/870.31–870.33; 137/554

(56) References Cited

U.S. PATENT DOCUMENTS 5,629,619  5/1997  Mednikov .................. 324/207.16

FOREIGN PATENT DOCUMENTS

| 22 61 379 | 7/1974 | (DE) . |
| 34 24 461 | 1/1985 | (DE) . |
| 41 28 159 | 2/1993 | (DE) . |
| 0 339 759 | 11/1989 | (EP) . |
| WO 88 06716 | 8/1988 | (WO) . |
| WO 94 03778 | 2/1994 | (WO) . |

*Primary Examiner*—Jay Patidar
(74) *Attorney, Agent, or Firm*—Alston & Bird LLP

(57) ABSTRACT

A noncontacting displacement sensor (1) is proposed with a measuring coil (2) to which alternating current can be applied, the measuring coil (2) having at least two voltage taps (3), with an electrically and/or magnetically conductive measuring object (5), and with an evaluation circuit (4) for evaluating and, if need be, determining an output voltage that corresponds to the position of the measuring object (5) with respect to the voltage taps (3). To provide the displacement sensor of a structural form that is as compact as possible, the measuring object (5) is arranged and displaceable in the interior of the measuring coil (2), the total impedance of the measuring coil (2) being independent of the position of the measuring object (5).

34 Claims, 7 Drawing Sheets

NON-CONTACT POSITION SENSOR

BACKGROUND OF THE INVENTION

The invention relates to a noncontacting displacement sensor with a measuring coil to which alternating current can be applied, the measuring coil having at least two voltage taps, with an electrically and/or magnetically conductive measuring object, and with an evaluation circuit for evaluating and, if need be, determining an output voltage corresponding to the position of the measuring object with respect to the voltage taps.

A noncontacting displacement sensor of the kind under discussion is also disclosed in WO 94 03778 and corresponding U.S. Pat. No. 5,629,619. The measuring coil of the known sensor has plurality of voltage taps that are arranged at defined intervals, and it is enclosed in a casing. The measuring object is a ring that surrounds the casing in spaced relationship and is displaceable along the casing wall. With the use of the known displacement sensor it is possible to determine the position of the ring with respect to the voltage taps arranged on the measuring coil. The presence of the ring between two voltage taps is effective on the impedance of the measuring coil segment that extends between these voltage taps and on all such "partial" impedances of segments of the measuring coil that follow in one direction. This means, that depending on the location of the measuring coil in which the ring is positioned, a varying quantity of partial impedances are influenced. With the known displacement sensor, voltages that can be tapped on successive segments of the measuring coil are added. In each instance, subtotals are formed which differ in the increasing number of considered voltage values. These subtotals are again added to an output voltage that may then be clearly related to the position of the ring.

The measuring object of the known displacement sensor is located outside of the coil casing. As a result, the measuring object is relatively exposed and unprotected. Furthermore, the known displacement sensor requires relatively much space, so as to ensure a mobility of the measuring object on the outer side of the coil casing.

It is therefore the object of the invention to describe a noncontacting displacement sensor of the kind under discussion that is of an as compact design as possible and requires for itself only relatively little space.

SUMMARY OF THE INVENTION

The above and other objects and advantages of the present invention are achieved by the provision of a non-contacting displacement sensor having a measuring coil to which an alternating current can be applied. The measuring coil has at least two voltage taps, and an electrically and/or magnetically conductive measuring object is arranged for displacement in the interior of the coil. An evaluation circuit is provided for evaluating and determining an output voltage that corresponds to the position of the measuring object. Also, the total impedance of the measuring coil is independent of the position of the measuring object.

In accordance with the invention, it has been recognized that partial impedances of segments of the measuring coil can be influenced not only by a ring surrounding the measuring coil as a measuring object, but also via a measuring object of an electrically and/or magnetically conductive material that extends in the interior of the coil. With this arrangement, it is possible to expose the measuring object in a purposeful manner to certain forces or pressures that are to be determined, whereas it is shielded against other undesired influences. Furthermore, the arrangement of the measuring object in the interior of the measuring coil results in an extremely compact construction of the sensor. In the displacement sensor of the present invention, the total impedance of the measuring coil is independent of the position of the measuring object, so that the current flowing through the measuring coil is dependent only on the applied voltage and not on the position of the measuring object. Accordingly, in the ideal case, the output voltage of the displacement sensor according to the invention is likewise dependent only on the position of the measuring object.

As regards a simple evaluation of the output voltage, it is especially advantageous when the positions of the voltage taps are selected such that in the absence of the measuring object, it is always possible to tap substantially the same voltage between two adjacent voltage taps. This will lead in the case of a measuring coil with a constant coil cross section over its length and uniform coil winds, to an equidistant arrangement of the voltage taps.

As regards a simple and reliable evaluation of the output voltage, the dimensioning of the measuring object should also be adapted to the spacing between the adjacent voltage taps. In an advantageous manner, the measuring object should maximally extend over the spacing between two adjacent voltage sections, so that it is simple to localize between voltage taps.

Advantageous materials for the measuring object include all materials known from practice, which can be used to realize coil cores. Especially suitable are ferromagnetic materials and materials with a low resistivity.

Depending on its field of application, the displacement sensor of the present invention may be realized with different measuring coils, i.e., with different coil geometries. Thus, it would be possible to use as a measuring coil, for example, an elongate coil in the form of a cylindrical coil or a coil with a square cross section. However, it would likewise be possible to use a toroidal coil as a measuring coil.

In an advantageous embodiment of the displacement sensor according to the invention, the interior of the measuring coil accommodates a coil tube that extends preferably over the entire length of the measuring coil. The coil tube again accommodates the measuring object for displacement therein. On the one hand, the coil tube serves to stabilize the measuring coil, since same can be wound practically around the coil tube. On the other hand, it also serves as a guideway for the movement of the measuring object. This permits reducing in an effective manner the mechanical stress of the measuring coil by the measuring object. The coil tube should be made of a material that ensures an electric insulation between the measuring coil and the measuring object. For this reason the material should be nonferromagnetic and have a high resistivity. Suitable therefor is stainless steel with corresponding properties, but also plastic or glass may be used.

Depending on the case of application, the displacement sensor of the present invention may be provided with a casing which either encloses only the measuring coil with the measuring object, and advantageously shields same even against interfering influences, or also encloses and protects in addition the evaluation circuit.

Likewise, with respect to a simple evaluation of the output voltage of the displacement sensor according to the invention, alternating current is to be applied to the measuring coil symmetrically and oppositely directed. For example, it is possible to apply as alternating current a sinusoidal voltage or even a square-wave voltage. Basically, it is possible to determine the output voltage in three different ways.

A first possibility consists of determining respectively the voltage between two voltage taps of the measuring coil. These voltage values must then be added in the sequence that is predetermined by the arrangement of the corresponding coil segments, namely, for the time being, to all possible subtotals that result in the case of this sequence. The output voltage will then result as a sum of these subtotals. In this procedure, only voltages are acquired that can be tapped, i.e., measured between adjacent voltage taps. With the aid of the evaluation circuit, the output voltage is computed from these voltage values, and only by evaluating the thus-computed output voltage is it possible to determine the position of the measuring object.

In a second variant of the displacement sensor according to the invention, the voltages are acquired respectively between the individual voltage taps and a reference potential, which corresponds to the foregoing subtotals. With the aid of the evaluation circuit, these acquired, namely measured voltage values are then added to the output voltage. Advantageously, the addition may occur with the aid of a summation amplifier that has preferably an inverting and a noninverting input.

Finally, the individual voltage taps of the displacement sensor according to the invention can also be combined to a common measured value tap. At this common measured value tap, it will then be possible to tap the output voltage. In this instance, the output voltage is thus realized and directly measured by means of circuitry. In fact, the evaluation circuit is used in this instance only to evaluate and not to determine the output voltage.

If the individual voltage taps are combined at a common measured value tap, it will be advantageous to interpose at least one resistor respectively between the individual voltage taps and the common measured value tap. The resistors could be either resistors with a substantially identical rating or even resistors with different ratings. However, to simplify the evaluation of the output voltage, the use of resistors with an identical rating is to be preferred. In this connection, it will also be advantageous, when the resistors have a rating that is by about two orders higher than the output resistance of the measuring coil.

Since the impedance of the measuring coil is normally temperature-dependent, and since with that the partial impedances are likewise temperature-dependent, temperature fluctuations become normally likewise effective on the output signal or the output voltage of the displacement sensor according to the invention, which may lead to measuring errors. For this reason, a particularly advantageous variant of the displacement sensor according to the invention is provided with means for compensating temperature influences.

To determine now the temperature influence on the output voltage of the displacement sensor, it is advantageous to supply the measuring coil not only with an ac voltage, but additionally with a dc voltage, i.e., superpose a dc voltage component upon the ac voltage component of the output voltage. The position of the measuring object is effective only on the ac voltage component, but not on the dc voltage component. Accordingly, it is possible to determine the temperature influence on the ac voltage component of the output voltage by separating the dc voltage component of the output voltage. Subsequently, this temperature influence may be compensated.

To be able to take also into account the temperature characteristic of the measuring coil as a whole, it will be advantageous, when the evaluation circuit also comprises means for determining the temperature. To this end, it is possible to determine, for example, a temperature-dependent dc or ac resistance. For example, with the aid of a microprocessor which stores the temperature response of the measuring coil, it is then possible to consider the temperature characteristic of the measuring coil.

There exist various possibilities of improving and further developing the teaching of the present invention in an advantageous manner. To this end, reference may be made the following description of several preferred embodiments of the invention with reference to the drawing. In conjunction with the description of the preferred embodiments of the invention, also generally preferred embodiments and further developments of the teaching are explained.

DETAILED DESCRIPTION OF THE PREFERRED EMBODIMENTS

Figure 1:
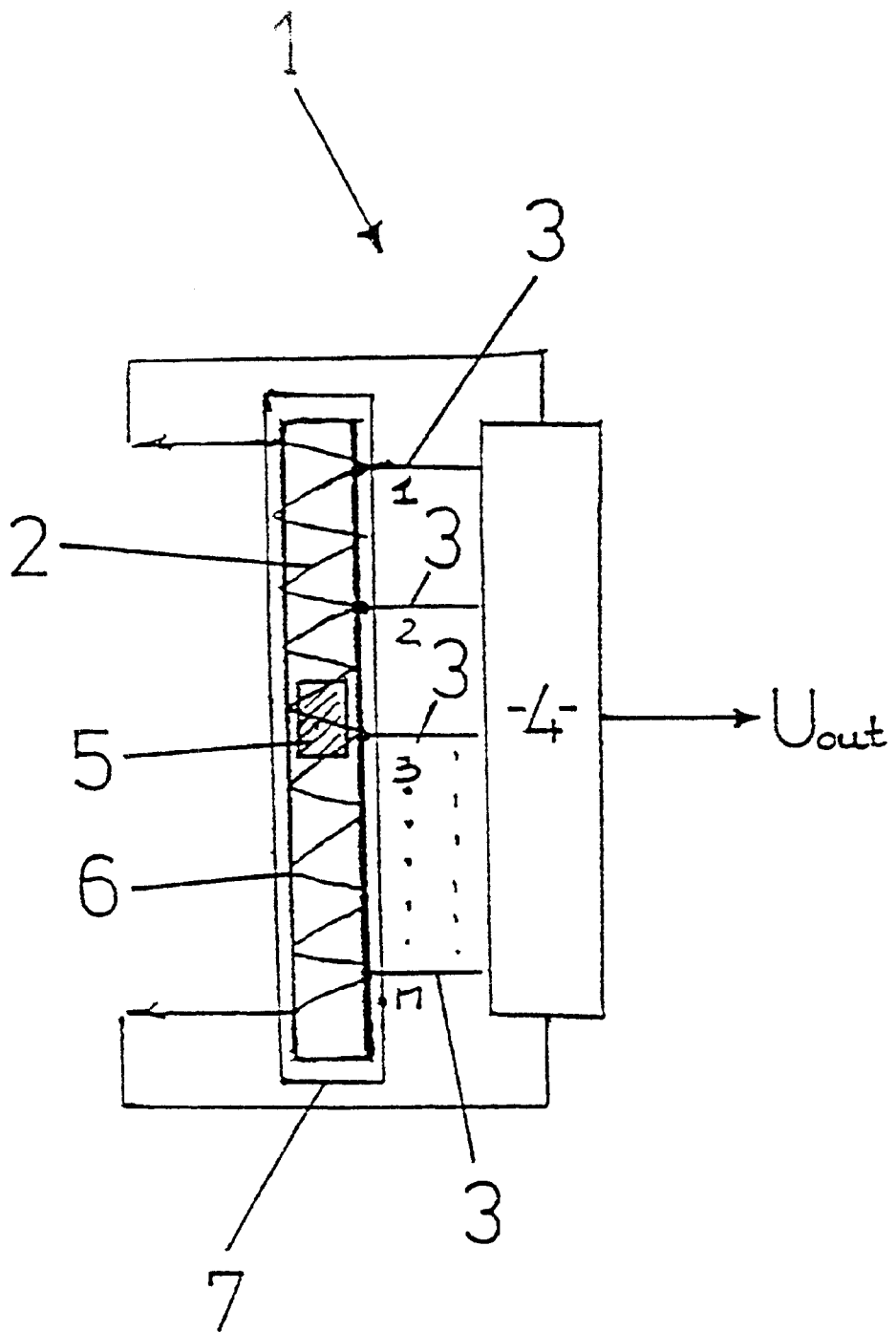
FIG. 1 is a schematic view of a displacement sensor according to the invention.

FIG. 1 illustrates a displacement sensor 1 with a measuring coil 2. The measuring coil 2 can be supplied with alternating current. At least two voltage taps 3 are provided on the measuring coil 2. Since, depending on the use of displacement sensor 1, it is possible to provide a desired number of voltage taps 3, FIG. 1 indicates 1, 2, 3, . . . n voltage taps 3. The voltage taps 3 connect to an evaluation circuit 4. In the illustrated embodiment, the voltage supply to the measuring coil 2 occurs likewise via evaluation circuit 4. The illustrated displacement sensor 1 further comprises a measuring object 5. In accordance with the invention, the measuring object 5 is arranged and displaceable in the interior of the measuring coil 2. The measuring coil 2 is designed such that its total impedance is independent of the position of measuring object 5. The presence of the measuring object 5 in one of the segments of measuring coil 2 that are defined by the voltage taps 3, however, influences the partial impedances of the corresponding coil segment and coil segments subsequent thereto in one direction. With the aid of evaluation circuit 4, it is therefore possible to determine the position of the measuring object 5 with respect to the voltage taps 3. Details of the measured data evaluation are described in more detail with reference to FIG. 4.

The measuring coil 2 as shown in FIG. 1 is an elongate coil, namely a cylindrical coil with uniform winds. The positions of the voltage taps 3 are selected such that in the absence of the measuring object 5, it is always possible to tap substantially the same voltage between two adjacent voltage taps 3. To this end, the voltage taps 3 are arranged substantially equidistantly, The measuring object 5 is dimensioned such that it maximally extends over the spacing between two adjacent voltage taps 3. Since it is intended to be effective on partial impedances of the respective segments of measuring coil 2, the measuring object 5 is formed of a ferromagnetic material or of a material with a low resistivity.

The measuring coil 2 is wound about a coil tube 6. The measuring object 5 is located in the interior of the coil tube 6. To prevent interference with the operability of the displacement sensor 1, the coil tube 6 is formed of a nonferromagnetic material with a high resistivity. This material could be a stainless steel with corresponding properties. However, it is also possible to use a plastic or glass tube as coil tube 6.

Finally, the displacement sensor 1 as shown in FIG. 1 comprises a casing 7 that surrounds only the measuring coil 2 with the coil tube 6 and the measuring object 5. From the casing 7, there extend on the one hand connections to the supply and evaluation circuit 4 and on the other hand the voltage taps 3. In an advantageous variant of the illustrated displacement sensor 1, the housing 7 could also enclose the evaluation circuit 4 with all supply lines.

The evaluation of the voltage values measured by the displacement sensor shown in FIG. 1 are described in more detail below with reference to FIG. 2.

Figure 2:
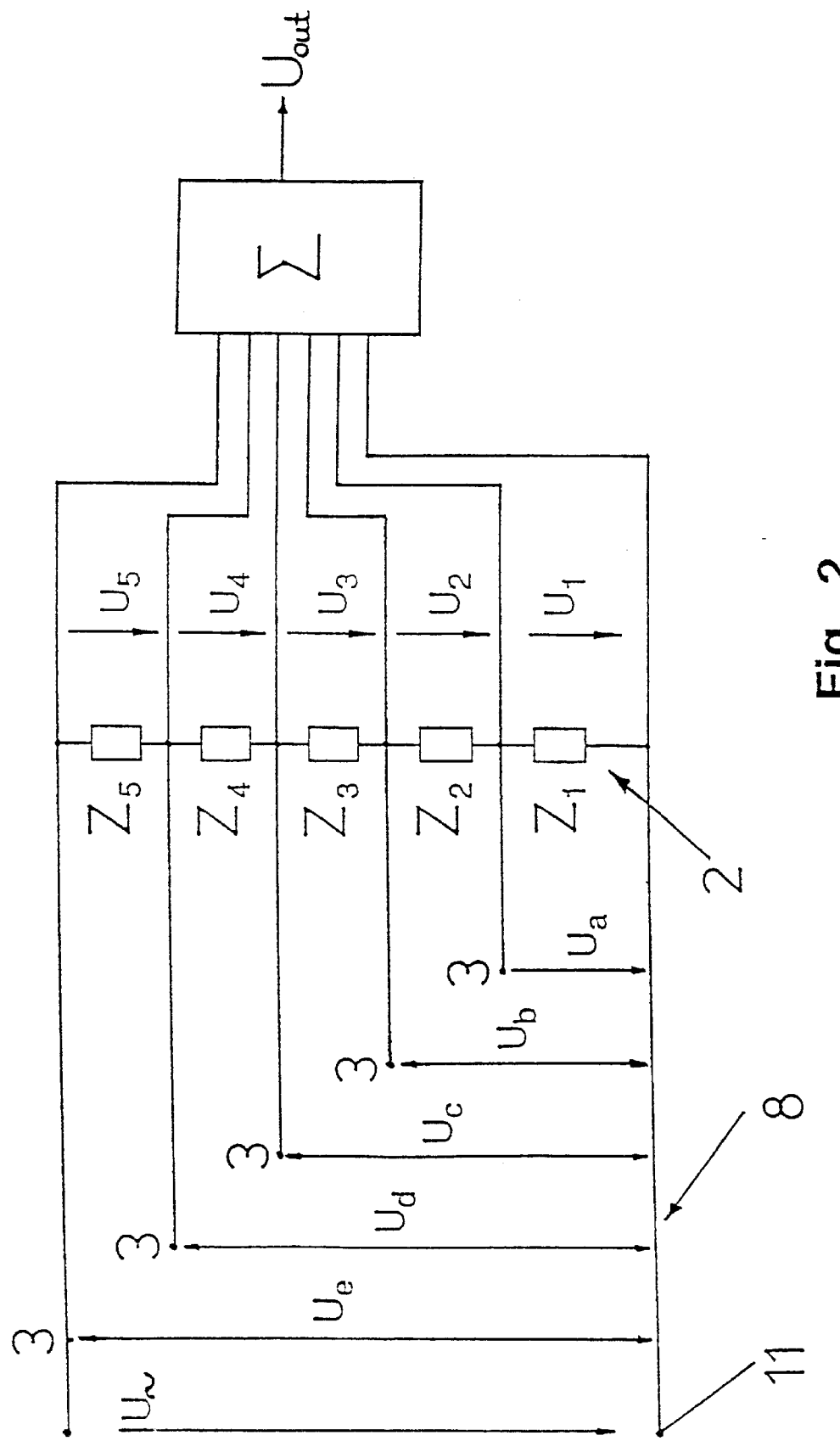
FIG. 2 is a first diagram for explaining the different tap and evaluation variants.

In the left portion of FIG. 2, the measuring coil 2 is schematically shown as serially connected impedances $Z_1$ to, for example, $Z_5$. These impedances $Z_1$ to $Z_5$ correspond to the partial impedances of the segments of measuring coil 2 that extend between the voltage taps 3. The measuring coil 2 is supplied with an ac voltage $U_\sim$.

The voltages $U_1$ to $U_5$ correspond to the voltages that can each be tapped between adjacent voltage taps 3, namely the voltages $U_1$ to $U_5$ that drop above the impedances $Z_1$ to $Z_5$. Depending on the realization in the terms of circuitry, it is also possible to tap in the form of subtotals $U_a$ to $U_e$ the voltages $U_1$ to $U_5$ that are added in ascending sequence, where $U_a = U_1$
$U_b = U_1 + U_2$
$U_c = U_1 + U_2 + U_3$
$U_d = U_1 + U_2 + U_3 + U_4$, and
$U_e = U_1 + U_2 + U_3 + U_4 + U_5$.

These subtotals $U_a$ to $U_1$ are then again added to the output voltage, hereafter $U_{out}$.

$$U_{out} = U_a + U_b + U_c + U_d + U_e \qquad (1)$$

or $$U_{out} = U_1 + 2U_2 + 3U_3 + 4U_4 + 5U_5 \qquad (2)$$

Thus, to determine the output voltage $U_{out}$, there exist two variants of proceeding:

Variant 1: The tapped voltages value $U_a$, $U_b$, $U_c$, $U_d$, $U_e$ are added by an adder to a total voltage, the output voltage $U_{ut}$ (equation (1)).

Variant 2: The individual voltages $U_1$, $U_2$, $U_3$, $U_4$, $U_5$ as measured between the voltage taps 3 are weighted according to equation (2) and added by an adder to the output voltage $U_{out}$.

In both variants, the voltages can be added by the evaluation circuit 4 of FIG. 1 both in analog and in digital form.

Depending on the position, in which the measuring object 5 is located, only certain impedances of the impedances $Z_1$ to $Z_5$ are respectively influenced. If the measuring object 5 is, for example, in the region of the first segment of measuring coil 2, all impedances $Z_1$ to $Z_5$ will be influenced. However, if the measuring object 5 is the central, third segment of the measuring coil 2, only impedances $Z_3$ to $Z_5$ will be influenced. As follows from equation (2), $Z_2$ has twice the influence on output voltage $U_{out}$ as $Z_1$, $Z_3$ a triple influence, etc. Accordingly, the position of the measuring object 5 is effective not only on the affected impedances, but also on the subtotals $U_a$ to $U_e$, and finally on the output voltage $U_{out}$. Consequently, it is possible to associate the output voltage $U_{out}$ clearly to one position of the measuring object 5 with respect to the voltage taps 3.

Figure 3:
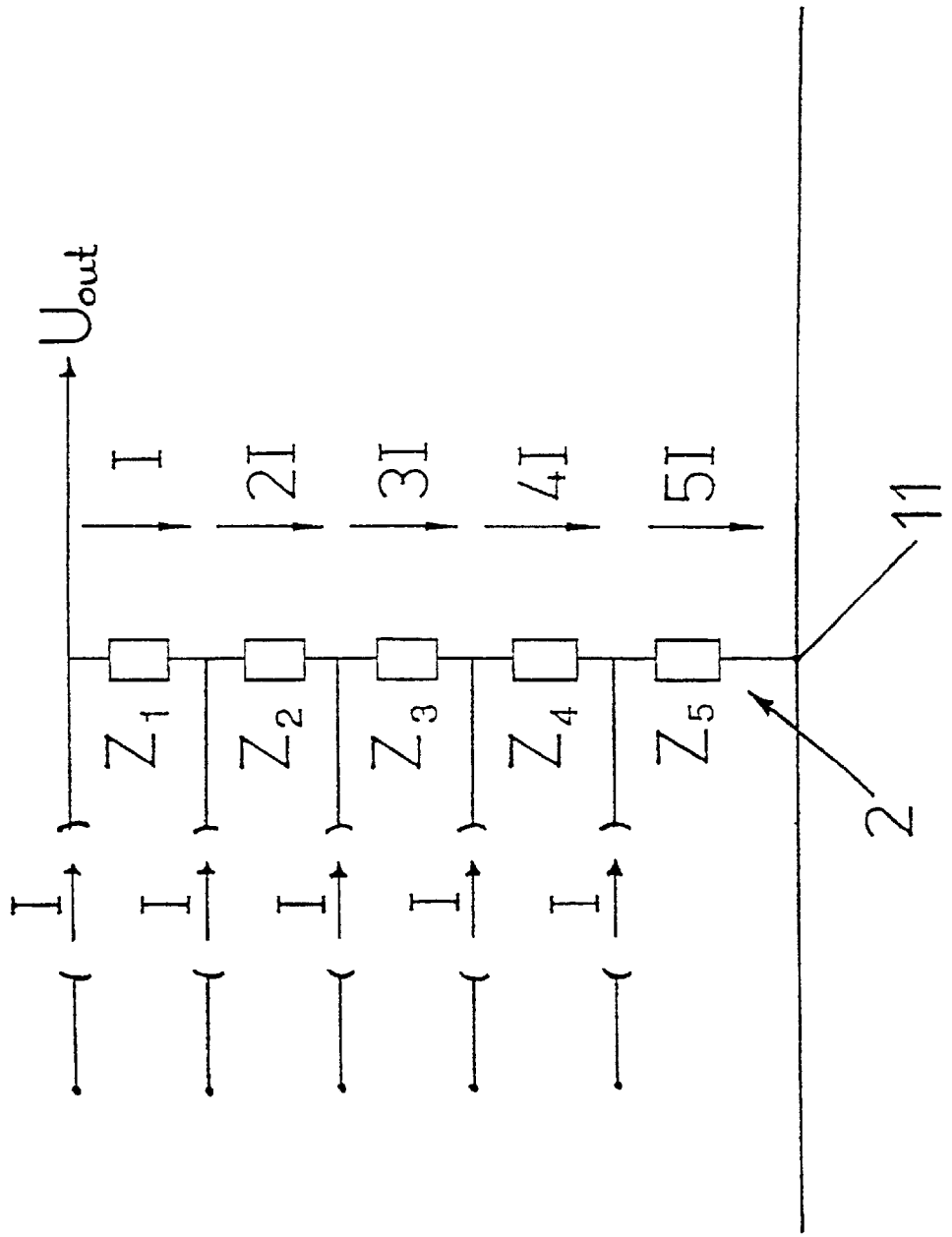
FIG. 3 is a second diagram for explaining a data evaluation by adding up currents.

FIG. 3 is a second diagram for explaining the variants of the evaluation. In this instance—similarly to FIG. 2—the measuring coil 2 is schematically shown as a series connection of impedances $Z_1$ to $Z_5$. The measuring coil 2 is supplied by five sources of alternating current. For this reason, a current I flows via impedance $Z_1$, a current 2I via impedance $Z_2$, a current 3I via impedance $Z_3$, a current 4I via impedance $Z_4$, and a current 5I via impedance $Z_5$. In this diagram, the currents I are directly added in the measuring coil 2. The output signal is:

$$U_{out} = I(Z_1 + 2Z_2 + 3Z_3 + 4Z_4 + 5Z_5) \qquad (3)$$

Figure 4:
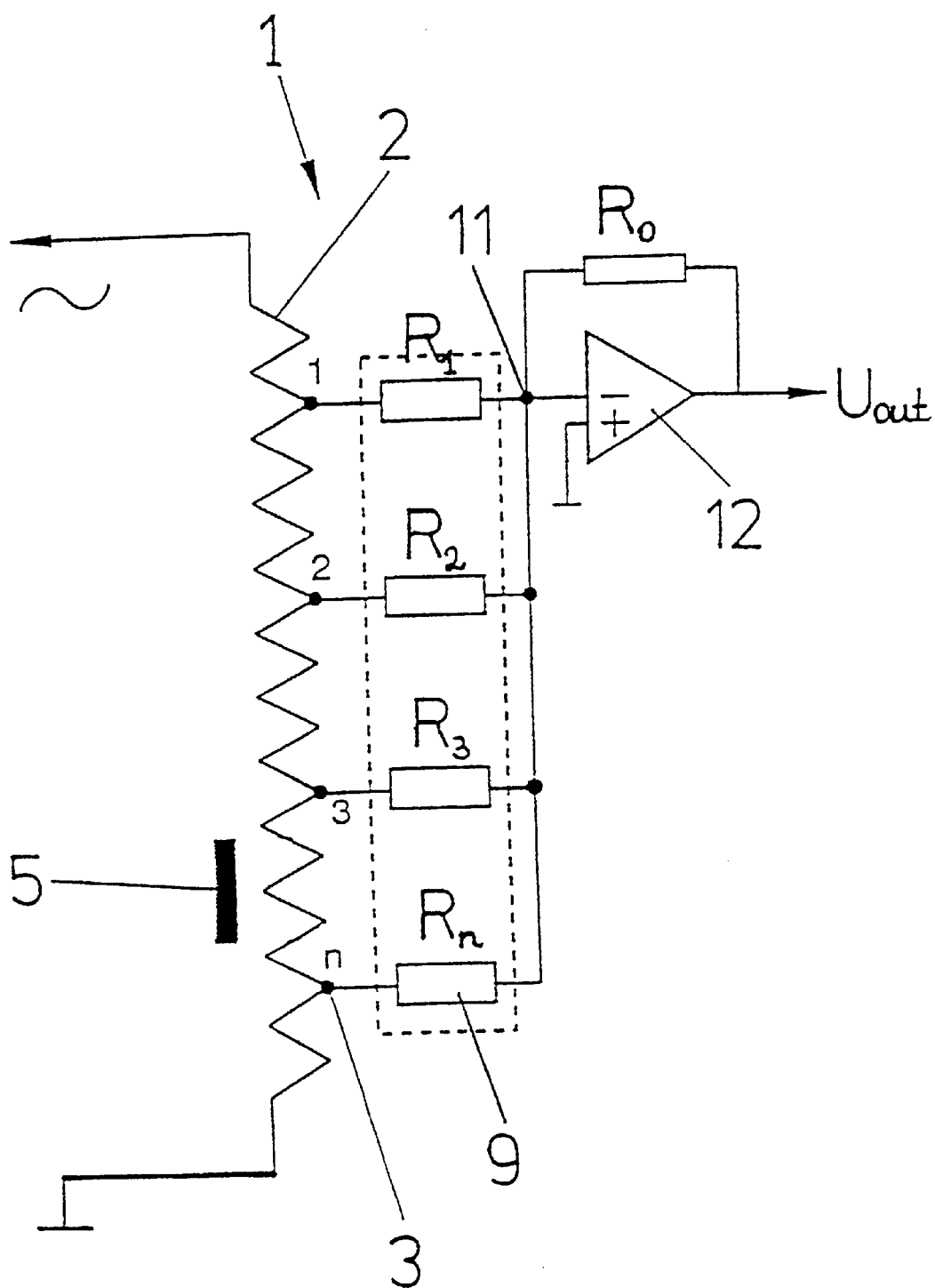
FIG. 4 shows the displacement sensor of FIG. 1 with an amplifier that sums the individual voltages.

FIG. 4 shows a variant of the measured data acquisition within the scope of a displacement sensor 1 with a measuring coil 2 that can be supplied with ac voltage. In this variant, the measuring coil 2 comprises a plurality of voltage taps 3, and the measuring object 5 is arranged in the interior of the measuring coil 2. The addition of the voltage values occurs here with the aid of an adder. The individual voltage taps 3 extend, via resistors 9 ($R_1$ to $R_n$) and a junction 11 to the inverting input of a differential amplifier 12. The potential of the inverting input of differential amplifier 12 is "0", whereas the noninverting input is connected to ground. This means that the tapped voltage values can be added independently of one another. A resistor $R_0$ is connected parallel to the inverting input and output of differential amplifier 12. When all resistors 9 ($R_1$ to $R_n$) are identical, ($R_1 = R_2 = \ldots = R_n$), the amplification factor K of the differential amplifier 12 results in $$K = \frac{R_0}{R}.$$

For the output voltage $U_{out}$ amplified by the differential amplifier 12, $$U_{out} = -\frac{U_\sim}{Z} \cdot K \sum_{i=1}^{n} i \cdot z_i,$$

where $U_\sim$ is the ac voltage applied to the measuring coil 2 and Z the total impedance of the measuring coil 2.

The resistors 9 ($R_1$ to $R_n$) may also have different ratings. This permits increasing the sensitivity of the displacement sensor in certain regions, for example in the marginal regions.

Figure 5:
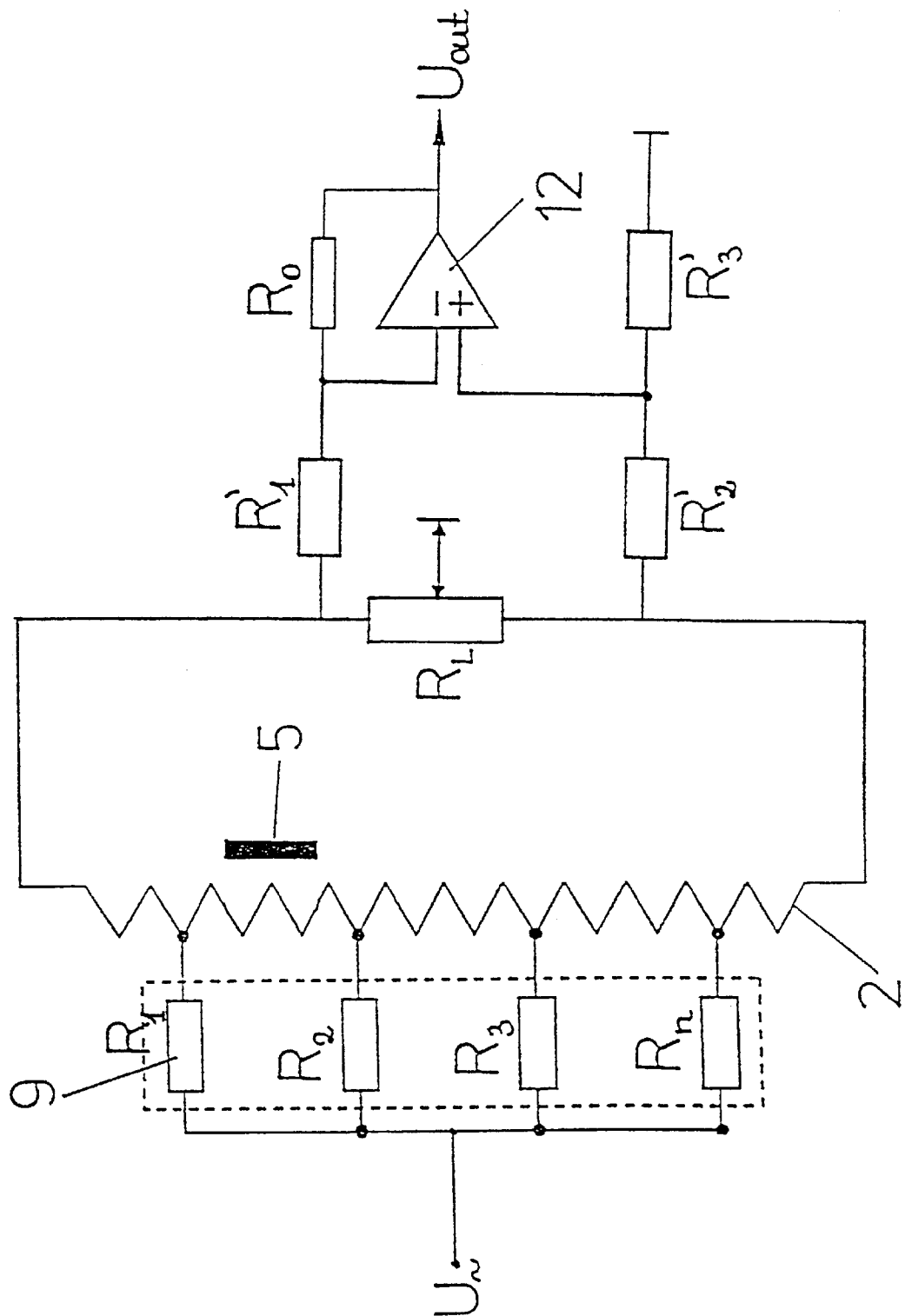
FIG. 5 shows the displacement sensor of FIG. 1, wherein the currents are added.

According to the evaluation diagram shown in FIG. 3, the individual segments of measuring coil 2 receive each a certain current I in the embodiment of a displacement sensor shown in FIG. 5. The corresponding current sources are realized by a source of voltage $U_\sim$ and resistors $R_1$ to $R_n$, where $R_1=R_2=\ldots=R_n>>Z_1=Z_2=\ldots=Z_n$.

The measuring coil 2 is connected to the inverting and to the noninverting input of differential amplifier 12. With an interposed load potentiometer $R_L$ it is possible to adjust the zero point at the output of differential amplifier 12, when the measuring object 5 is in the center of the measuring coil 2. If the measuring object 5 is deflected from its central position, the output voltage $U_{out}$ will change proportionately, and the phase will change by 180°.

Figure 6:
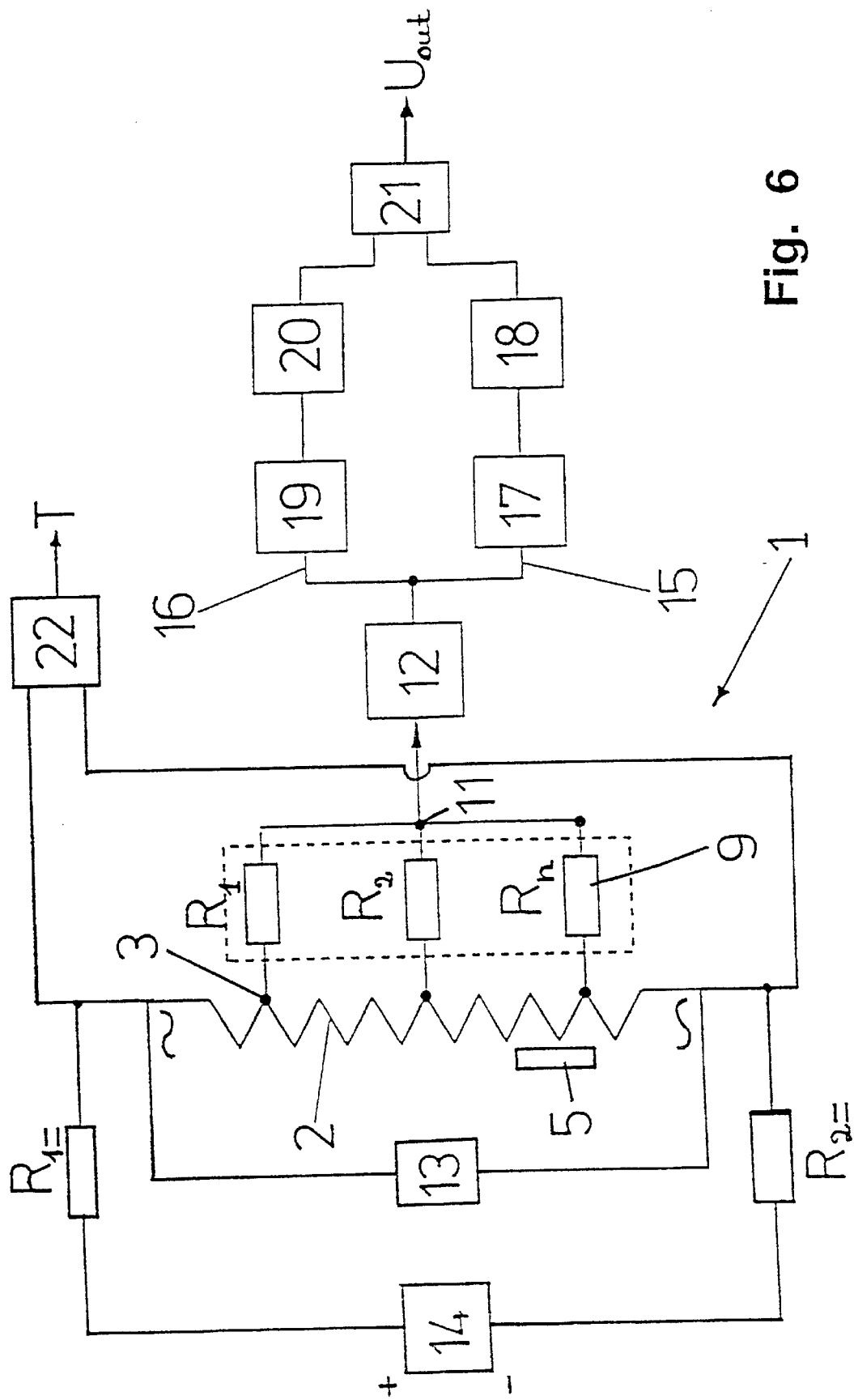
FIG. 6 shows a displacement sensor corresponding to the displacement sensor of FIG. 4, which is provided in addition with means for compensating the temperature.

FIG. 6 shows a displacement sensor 1 that is constructed substantially in the same manner as the displacement sensor shown in FIG. 4, except that the evaluation circuit is supplemented with means for compensating the temperature. To this end, the measuring coil 2 is connected not only to a source of ac voltage 13, but also—via resistors $R_1$=and $R_2$=—to a source of dc voltage 14. Accordingly, the differential amplifier 12 receives an output signal or an output voltage, in which an ac component and a dc component superpose each other. Irrespective of the position of measuring object 5, the dc component, however, is dependent on the temperature in the same way as the ac component.

The output signal amplified via amplifier 12 is now split to two channels 15 and 16. In channel 15, the dc component of the output signal is determined with the aid of a low-frequency filter 17 and a subsequent dc amplifier 18. In channel 16, the ac component of the output signal is determined with the aid of a demodulator 19 and a subsequent filter and, if need be, an amplifier 20. Since the dc component is subjected only to temperature influence, and the ac component is dependent both on the temperature and on the position of measuring object 5, it is now possible to compensate with the aid of the dc component the temperature influence of the ac component. To this end, the two channels 15 and 16 are combined and balanced in an end amplifier 21. At the output of end amplifier 21, it is then possible to tap the output voltage $U_{out}$ that has been cleared from temperature influences. When the measuring coil 2 is supplied with two complementary voltages (symmetrically to the reference potential), and the measuring object 5 is located in the center of measuring coil 2, the output signal will equal "0". In this instance, the displacement sensor 1 functions like a differential sensor (zero in the center).

With the aid of the illustrated circuit, it is further possible to determine the absolute value of the temperature by way of determining the resistance with the use of component 22. This may be useful for certain applications of the displacement sensor 1 according to the invention.

Figure 7:
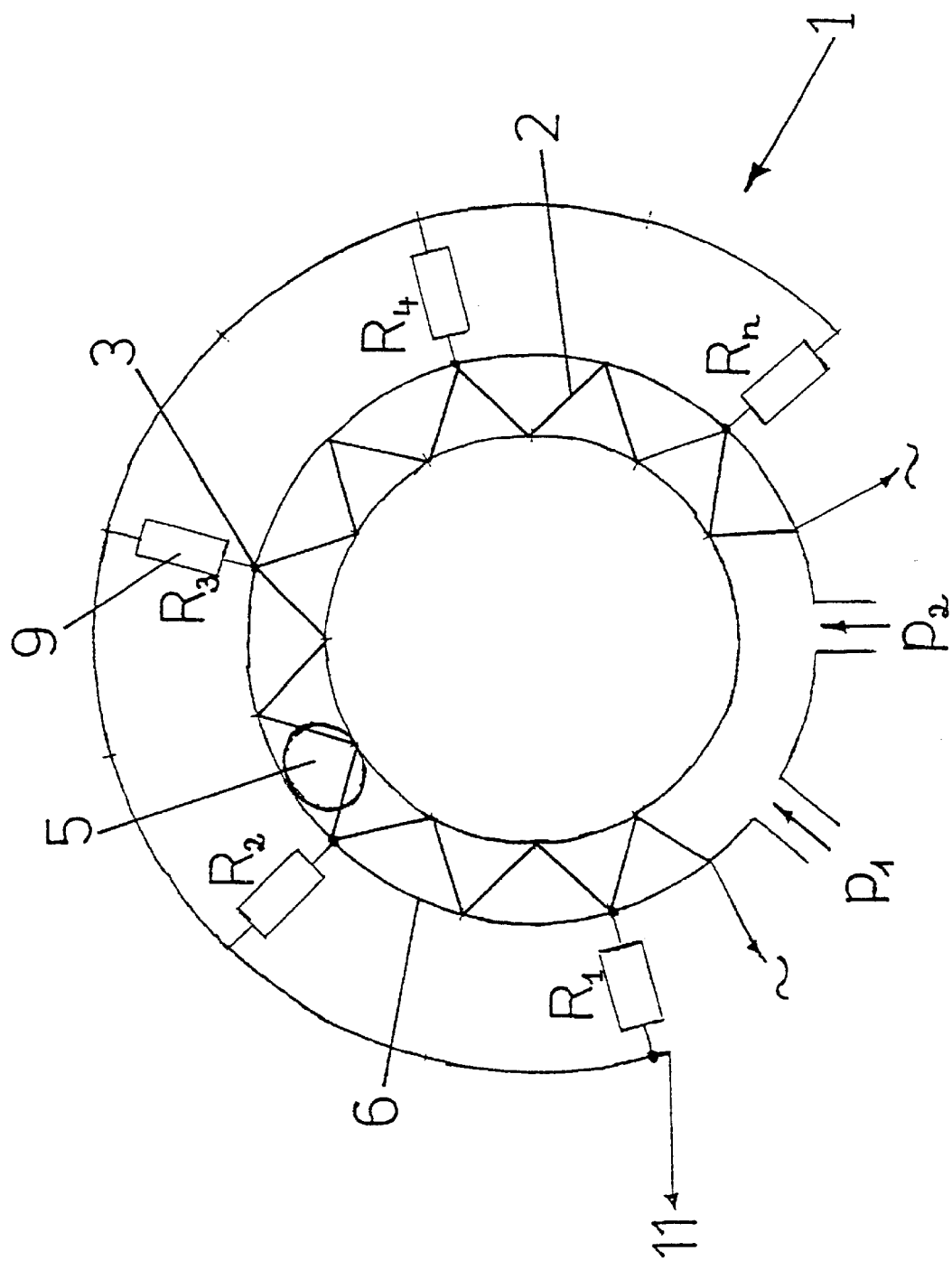
FIG. 7 shows a further constructional variant of a displacement sensor according to the invention.

FIG. 7 illustrates a special structural form of the displacement sensor 1 with a toroid as measuring coil 2. In this embodiment, the measuring coil is wound on an annular coil tube 6 which has two openings for receiving pressures (p1 and p2). The measuring object is a ball 5, whose position adjusts itself as a result of applied pressures p1 and p2. The voltage taps 3 of this embodiment may be wired according to any variant shown in FIGS. 1 to 6.

As regards further, advantageous variants of the displacement sensor not shown in the Figures, the general part of the description is herewith incorporated by reference.

What is claimed is:

1. Non-contacting displacement sensor with a measuring coil to which an alternating current can be applied, the measuring coil having at least two voltage taps, with an electrically and/or magnetically conductive measuring object, and with an evaluation circuit for evaluating and determining an output voltage that corresponds to the position of the measuring object with respect to the voltage taps, the measuring object being arranged and displaceable in the interior of the measuring coil, and the total impedance of the measuring coil being independent of the position of the measuring object, wherein sources-of alternating current supply the measuring coil and the sources of alternating current are provided by a source of ac voltage and intermediate resistors.

2. Displacement sensor of claim 1, wherein the measuring coil is connected to the inverting and the noninverting input of a differential amplifier of the evaluation circuit, and that with the aid of an interposed load potentiometer the zero point is adjustable at the output of the differential amplifier, when the measuring object is in the center of the measuring coil.

3. Displacement sensor of claim 1, wherein the evaluation circuit generates an output voltage that changes proportionately, when the measuring object deflects from a center position of the measuring coil, the phase of the output voltage being changed by 180°.

4. Displacement sensor of claim 1, wherein the positions of the voltage taps are selected such that in the absence of the measuring object substantially the same voltage can always be tapped between two adjacent voltage taps.

5. Displacement sensor of claim 1, wherein the measuring object maximally extends over the spacing between two adjacent voltage taps.

6. Displacement sensor of claim 1, wherein the measuring object is formed of a ferromagnetic material.

7. Displacement sensor of claim 1, wherein the measuring object is formed of a material with a low resistivity.

8. Displacement sensor of claim 1, wherein the measuring coil is an elongate coil.

9. Displacement sensor of claim 8, wherein the measuring coil is a cylindrical coil.

10. Displacement sensor of claim 1, wherein in the interior of the measuring coil a coil tube is arranged that extends preferably over the entire length of the measuring coil, and the measuring object is arranged in the interior of the coil tube.

11. Displacement sensor of claim 10, wherein the coil tube is formed of a nonferromagnetic material with a high resistivity.

12. Displacement sensor of claim 11, wherein the coil tube is formed of stainless steel.

13. Displacement sensor of claim 10, wherein the coil tube is formed of a plastic.

14. Displacement sensor of claim 10, wherein the coil tube is formed of glass.

15. Displacement sensor of claim 1, wherein the measuring coil is supplied symmetrically with two complementary voltages.

16. Displacement sensor of claim 1, wherein the measuring coil is supplied with a square-wave voltage.

17. Displacement sensor of claim 1, wherein the voltage is acquired between adjacent voltage taps, wherein the evaluation circuit comprises means for adding the acquired voltage values, and means for adding up the thereby resulting subtotals to the output voltage.

18. Displacement sensor of claim 1, wherein the voltage is acquired respectively between two individual voltage taps and a reference potential, and wherein the evaluation circuit comprises means for adding up the acquired voltage values to the output voltage.

19. Displacement sensor of claim 1, wherein the evaluation circuit comprises at least one summation amplifier as means for adding voltage values.

20. Displacement sensor of claim 19, wherein the amplifier has an inverting and a noninverting input.

21. Displacement sensor of claim 1, wherein the individual voltage taps are combined to a common measured data tap that permits tapping the output voltage, and wherein at least one resistor is interposed between the individual voltage taps and the measured data tap.

22. Displacement sensor of claim 21, wherein the resistors have a substantially identical rating.

23. Displacement sensor of claim 21, wherein the resistors have different ratings.

24. Displacement sensor of claim 21, wherein the resistors have a rating that is by two orders higher than the output resistance of the measuring coil.

25. Displacement sensor of claim 1, wherein the evaluation circuit includes means for compensating temperature influences.

26. Displacement sensor of claim 25, wherein the evaluation circuit comprises means for measuring the temperature and for considering the temperature characteristic of the measuring coil during the evalutation of the acquired voltage.

27. Displacement sensor of claim 1, wherein the measuring coil is realized in the form of a series connection of individual segments that comprise at least one coil wind, and wherein the individual segments of the measuring coil are each supplied by a source of ac current.

28. Noncontacting displacement sensor with a measuring coil to which an alternating current can be applied, the measuring coil having at least two voltage taps, with an electrically and/or magnetically conductive measuring object, and with an evaluation circuit for evaluating and determining an output voltage that corresponds to the position of the measuring object with respect to the voltage taps, the measuring object being arranged and displaceable in the interior of the measuring coil, and the total impedance of the measuring coil being independent of the position of the measuring object, wherein means for compensating the temperature are provided, which comprise a source of ac voltage and parallel thereto a source of dc voltage that is connected via at least one resistor to the measuring coil, that the means for compensating the temperature comprise a component for determining the absolute value of the temperature and an evaluation circuit with two channels, wherein the dc component can be determined in the first channel and the ac component of the output signal of the measuring coil in the second channel.

29. Displacement sensor of claim 28, wherein the temperature is measured by determining a dc or an ac resistance.

30. Displacement sensor of claim 28, wherein the evaluation circuit comprises means for separating and separately processing the ac voltage and dc voltage components of the acquired voltage and means for eliminating the temperature influence on the ac component.

31. Displacement sensor of claim 30, wherein the means for separating and separately processing the ac voltage and dc voltage components comprises respectively at least one filter, and wherein a demodulator is provided in addition for processing the ac component.

32. Displacement sensor of claim 30, wherein the evaluation circuit comprises a differential amplifier as means for eliminating the temperature influence on the ac component, wherein the demodulated, filtered and, if need be, amplified ac component is supplied to the one input of the differential amplifier, and the filtered and, if need be, amplified dc component is supplied to the other input of the differential amplifier.

33. Noncontacting displacement sensor with a measuring coil to which an alternating current can be applied, the measuring coil having at least two voltage taps, with an electrically and/or magnetically conductive measuring object, and with an evaluation circuit for evaluating and determining an output voltage that corresponds to the position of the measuring object with respect to the voltage taps, the measuring object being arranged and displaceable in the interior of the measuring coil, and the total impedance of the measuring coil being independent of the position of the measuring object, wherein the measuring coil is wound on a coil tube that comprises openings for applying pressures, that the position of the measuring object adjusts itself based on the applied pressures, and that the measuring coil is a toroidal coil, wherein a plurality of voltage taps extend via resistors and a junction to an input of the evaluation circuit.

34. Displacement sensor of claim 33, wherein the measuring coil is a toroidal coil and that a ball is used as measuring object.

* * * * *